(12) United States Patent
Wojtowicz

(10) Patent No.: US 10,640,717 B2
(45) Date of Patent: May 5, 2020

(54) METHODS AND SYSTEMS FOR RECOVERY OF HYDROCARBONS FROM FLUID CATALYTIC CRACKING SLURRY

(71) Applicant: UOP LLC, Des Plaines, IL (US)

(72) Inventor: Matthew R. Wojtowicz, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 384 days.

(21) Appl. No.: 14/513,036

(22) Filed: Oct. 13, 2014

(65) Prior Publication Data

US 2016/0102257 A1   Apr. 14, 2016

(51) Int. Cl.
| | | |
|---|---|---|
| C10G 55/00 | (2006.01) | |
| C10G 55/06 | (2006.01) | |
| B01J 8/18 | (2006.01) | |
| B01D 3/00 | (2006.01) | |
| C10G 7/00 | (2006.01) | |

(52) U.S. Cl.
CPC ............. C10G 55/06 (2013.01); B01D 3/009 (2013.01); B01J 8/18 (2013.01); C10G 7/00 (2013.01); *B01J 2208/00796* (2013.01)

(58) Field of Classification Search
None
See application file for complete search history.

(56) References Cited

U.S. PATENT DOCUMENTS

| | | |
|---|---|---|
| 4,077,866 A | 3/1978 | Owen et al. |
| 4,606,816 A | 8/1986 | Harandi |
| 4,776,948 A * | 10/1988 | Skraba .................. B01D 3/322 203/90 |
| 4,940,529 A | 7/1990 | Beaton et al. |
| 6,193,849 B1 * | 2/2001 | Lockett, Jr. ............ B01D 3/009 196/127 |
| 7,803,267 B2 | 9/2010 | Chester et al. |

(Continued)

OTHER PUBLICATIONS

Clark et al., Improving FCCUs: Bottoms System Upgrades, http://www.digitalrefining.com/article/1000324, Improving_FCCUs_bottoms_system_upgrades.html, Jul. 21, 2014.

(Continued)

*Primary Examiner* — Prem C Singh
*Assistant Examiner* — Brandi M Doyle
(74) *Attorney, Agent, or Firm* — Paschall and Associates, LLC; James C. Paschall

(57) ABSTRACT

Methods and systems for recovering a hydrocarbon from fluid catalytic cracking ("FCC") slurry and for separating a FCC slurry stream from a FCC effluent are provided. An exemplary hydrocarbon recovery method comprises the steps of: contacting a feed with a catalyst in a FCC reactor under conditions suitable to crack one or more hydrocarbons and generate a FCC effluent; separating the FCC effluent with a fractionation column to generate a product stream and a FCC slurry that collects in a lower portion of the fractionation column; drawing a first FCC slurry stream at a first temperature from a first location in the fractionation column; drawing a second FCC slurry stream at a second temperature from a second location in the fractionation column, and separating a hydrocarbon from the second FCC slurry stream, wherein the second temperature is higher than the first temperature.

10 Claims, 1 Drawing Sheet

(56) References Cited

U.S. PATENT DOCUMENTS

2011/0005972 A1\* 1/2011 Kim .................... C10G 65/043
208/65

OTHER PUBLICATIONS

Remesat et al., Stages FCCU Main Fractionator Revamp, Petroleum Technology Quarterly, v 13, n 4, pp. 129-130, 134-135, Oct./Nov./Dec. 2008; ISSN: 1362353X; Publisher: Crambeth Allen Publishing.

\* cited by examiner

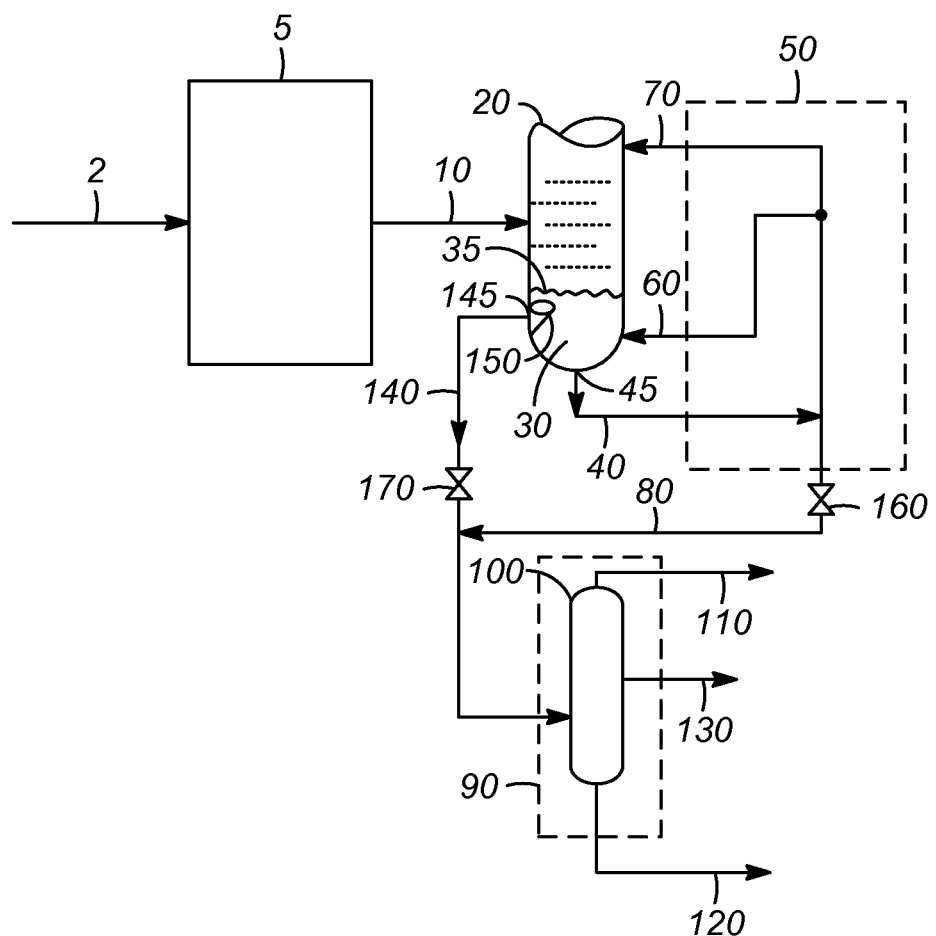

METHODS AND SYSTEMS FOR RECOVERY OF HYDROCARBONS FROM FLUID CATALYTIC CRACKING SLURRY

TECHNICAL FIELD

The technical field generally relates to hydrocarbon recovery from fluid catalytic cracking slurry, and more particularly to methods and systems for hydrocarbon recovery from fluid catalytic cracking slurry.

BACKGROUND

Fluid catalytic cracking ("FCC") is one of the most important conversion processes used in petroleum refineries. It is widely used to convert the high-boiling, high-molecular weight hydrocarbon fractions of petroleum crude oils to more valuable gasoline, olefinic gases, and other products. However, in addition to these more desirable products, the process also yields a bottom product oil, referred to as a slurry oil (or main column bottoms ("MCB")). Due to the nature of conventional catalytic cracking units, there is generally a significant amount of particulate matter (e.g, catalyst fine particulates) entrained in the slurry oil, along with a high-boiling, high-molecular weight hydrocarbon fraction and to a lesser degree, a portion of lower-boiling hydrocarbons.

In conventional refinery processes, a portion of the MCB is often recycled back into the main fractionation column above the entry of hot reaction product vapors, so as to cool and partially condense the reaction product vapors as they enter the main fractionation column. The remainder of the MCB is conventionally pumped out of the main fractionation column and sent to a MCB filtration unit or a tank where the fines are allowed to settle. However, conventional MCB processing methods and apparatus face significant reliability challenges due to coke accumulation and fouling that occurs at elevated temperatures.

In efforts to reduce coke accumulation and fouling, conventional MCB processing methods and systems typically involve reducing the temperature of MCB in the main fractionation column by recycling a cooled portion of the MCB as a quench liquid back into the pooled MCB in the main fractionation column. However, that separation of lighter hydrocarbons such as light cycle oil and heavy cycle oil from MCB is limited by the design and operation of conventional systems and methods. Specifically, quenching pooled MCB results in delivery of a quenched MCB stream to a separation zone at a temperature that is sub-optimal for separation.

Accordingly, it is desirable to provide methods and systems that allow for recovery of hydrocarbons from a FCC slurry stream at an elevated temperature while still quenching the majority of pooled MCB in the main fractionation column so as to provide a second FCC slurry stream at a second, reduced, temperature to reduce fouling. Furthermore, other desirable features and characteristics of the present invention will become apparent from the subsequent detailed description of the invention and appended claims, taken in conjunction with the accompanying drawings and this background of the invention.

BRIEF SUMMARY

Methods for recovering a hydrocarbon from fluid catalytic cracking slurry and apparatuses for fluid catalytic cracking are provided. An exemplary hydrocarbon recovery method includes the steps of: contacting a feed with a catalyst in a fluid catalytic cracking ("FCC") reactor under conditions suitable to crack one or more hydrocarbons in the feed and generate a FCC effluent; separating the FCC effluent with a fractionation column to generate a product stream and a FCC slurry, wherein the FCC slurry collects in a lower portion of the fractionation column; drawing a first FCC slurry stream at a first temperature from a first location in the fractionation column; drawing a second FCC slurry stream at a second temperature from a second location in the fractionation column, wherein the second location is different than the first location, and the second temperature is higher than the first temperature; and separating a hydrocarbon from the second FCC slurry stream.

In another embodiment, an exemplary hydrocarbon recovery method includes the steps of: contacting a feed with a catalyst in a fluid catalytic cracking ("FCC") reactor under conditions suitable to crack one or more hydrocarbons in the feed and generate a FCC effluent; separating the FCC effluent with a fractionation column to generate a product stream and a FCC slurry, wherein the FCC slurry collects in a lower portion of the fractionation column; drawing a FCC slurry stream from the fractionation column, wherein the FCC slurry stream is drawn from the fractionation column at a temperature of about 365° C. to about 390° C.; and separating a hydrocarbon from the FCC slurry stream with a vacuum distillation column.

In another embodiment, an apparatus for fluid catalytic cracking ("FCC") includes: a FCC reactor configured to receive a feed and contact the feed with a catalyst under conditions suitable to crack one or more hydrocarbons in the feed and generate a FCC effluent; a fractionation column in fluid communication with the FCC reactor; the fractionation column configured to receive the FCC effluent and separate the FCC effluent into a product stream and a FCC slurry; wherein the FCC slurry collects in a bottom portion of the fractionation column; a cooling zone in fluid communication with the fractionation column, wherein the cooling zone is configured to receive a first FCC slurry stream at a first temperature from a first location of the fractionation column, cool the first FCC slurry stream, and return at least a portion of cooled first FCC slurry stream to the fractionation column; and a separation zone in fluid communication with the fractionation column, the separation zone configured to receive a second FCC slurry stream at a second temperature from a second location of the fractionation column and separate a hydrocarbon from the second FCC slurry stream; wherein the second location is different than the first location, and the second temperature is higher than the first temperature.

BRIEF DESCRIPTION OF THE DRAWING

The various embodiments will hereinafter be described in conjunction with the following drawing FIGURE, wherein:

FIG. 1 is a block diagram illustrating process flow for a method and apparatus in accordance with an exemplary embodiment.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Fluid catalytic cracking ("FCC") is a conventional conversion process used in refineries to convert high-boiling, high-molecular weight hydrocarbons to more economically valuable gasoline, olefinic gases, and other lower-molecular weight hydrocarbon products. Conventional methods of fluid catalytic cracking include contacting a feed with a catalyst in a FCC reactor under conditions suitable to crack one or more hydrocarbons from the feed and generate a FCC effluent. Conventional FCC reactors, catalysts, and suitable conditions of their operation are known to those of skill in the art.

The FCC effluent is directed into a fractionation column, which is used to separate desirable hydrocarbon components from the FCC effluent and generate one or more product streams. Residual materials from this separation collect (i.e., pool) in a lower portion of the fractionation column and are known as FCC slurry (also referred to herein as main column bottoms, or MCB). FCC slurry includes particulate matter such as catalyst fines that carry over from the FCC reactor as solids entrained in the FCC effluent as well as various hydrocarbons. The hydrocarbons in the FCC slurry are predominantly heavy, high-boiling hydrocarbons. However, depending on the conditions employed in the FCC reactor and fractionation column, as well as the particulars of the feed, the FCC slurry may contain as much as 15 wt. % of a lighter, lower-boiling liquid hydrocarbons, such as light cycle oils and heavy cycle oils. These lighter liquid hydrocarbons have boiling points from about 170° C. to about 540° C., and may have value, e.g. as additives or constituents in diesel fuel. Thus, separation of these lighter liquid hydrocarbons from the FCC slurry is desirable.

Various embodiments provided herein relate to methods and apparatuses for recovery of the lighter hydrocarbons (in particular light cycle oils and/or heavy cycle oils that boil within the temperature ranges of about 170° C. to about 340° C., and about 340° C. to about 540° C., respectively) from FCC slurry. In embodiments, the lighter hydrocarbons from the FCC slurry are not recovered solely from a single FCC slurry stream which has been quenched, as occurs in conventional systems. Rather, recovery of the lighter hydrocarbons from the FCC slurry is facilitated by removing two FCC slurry streams from the fractionation column, with each FCC slurry stream at a different temperature. A first FCC slurry stream (at a first, lower, temperature) is directed to a MCB pumparound circuit (i.e., a cooling zone) for heat exchange and recycling of a MCB quench stream. A second FCC slurry stream (at a second, higher, temperature) is sent to a separation zone for recovery of at least a portion of the hydrocarbons contained therein.

In order to draw first and second FCC slurry streams from the fractionation column at different temperatures, in embodiments, the first and second FCC slurry streams are removed from the fractionation column from two different locations. The first FCC slurry stream is drawn from a first location selected such that the temperature of the first FCC slurry stream is at a first, quenched, temperature. That is, the first FCC slurry stream may be removed from the fractionation column from a first location that is below an entry location of a MCB quench stream. In some embodiments, the first FCC slurry stream is removed from the fractionation column at or near the bottom of the fractionation column (e.g., from a point in the lower 10% of the height of the fractionation column).

The second FCC slurry stream is removed from the fractionation column at a second location that is higher than the first location. In some embodiments, the second FCC slurry stream is removed from the fractionation column at a second location that is above the entry of the MCB quench stream. Generally speaking, FCC slurry pooled in the fractionation column is not perfectly homogenized, in particular with respect to temperature. Rather, pooled FCC slurry in the fractionation column may exhibit a continuous or discontinuous temperature gradient, such that FCC slurry located higher in the fractionation column is generally at a higher temperature than FCC slurry located lower in the fractionation column. Thus, removing a first FCC slurry stream from a first location in the fractionation column provides a first FCC slurry stream at a first temperature, and removing a second FCC slurry stream from a second, different location in the fractionation column provides a second FCC slurry stream at a second temperature. With the first location and second location oriented according to embodiments described herein, the second location is higher in the fractionation column than the first location, and thus the second temperature is higher than the first temperature.

As indicated above, the second FCC slurry stream is directed to a separation zone for recovery of lighter hydrocarbons. In some embodiments, the second FCC slurry stream is subjected to a separation protocol without the input of additional heat. In some embodiments, lighter hydrocarbons are separated from the second FCC slurry stream via a vacuum fractionation column. In such embodiments, the increased temperature of the second FCC slurry stream provides for greater separation efficiency than would otherwise be achieved by attempting the same separation protocol to a quenched FCC slurry stream (e.g., the first FCC slurry stream).

An exemplary embodiment will now be described with reference to FIG. 1. The methods and apparatuses described herein include contacting a feed stream 2 with a catalyst in a FCC reactor 5, e.g., by introducing the feed 2 into the FCC reactor 5, under conditions suitable to crack one or more hydrocarbons in the feed 2 and generate a FCC effluent 10. FCC effluent 10 is then directed to a fractionation column 20, which separates various components from the FCC effluent 10 and generates one or more product streams (not shown). Residue that collects in a lower portion of the fractionation column 20 following this separation is referred to herein as FCC slurry 30 (also known as main column bottoms, or MCB).

As indicated above, FCC slurry 30 generally includes particulate matter, such as catalyst fines, and various hydrocarbons. Certain hydrocarbons typically present in FCC slurry 30 are susceptible to coking at temperatures otherwise normally present in the main fractionation column 20, particularly in the presence of catalyst fines. As such, in some embodiments and as seen in the exemplary embodiment shown in FIG. 1, a MCB quenching stream 60 is used to reduce the temperature of pooled FCC slurry 30 in the fractionation column 20. Quenching is conducted via a cooling zone 50, which draws a first FCC slurry stream 40 from the fractionation column 20 at a first location 45 located at or near the bottom of the fractionation column 20. In some embodiments, the temperature of the first FCC slurry stream 40 when drawn from the fractionation column 20 is about 355° C. to about 365° C.

In embodiments, the first FCC slurry stream 40 is directed to a cooling zone 50 (also known as a MCB processing system), where the first FCC slurry stream 40 is cooled. In some embodiments, the first FCC slurry stream 40 is cooled via the cooling zone 50 to a temperature of about 250° C. to about 275° C. The cooling zone 50 may include any of a number of conventional components and sub-systems not shown in FIG. 1, including e.g., pumps, valves, heat exchangers, debutanizers, etc., in parallel or in series.

In embodiments, a first portion 60 of the cooled first FCC slurry stream 40 is reintroduced into the fractionation column 20 as the MCB quenching stream 60. In some embodiments, the MCB quenching stream 60 is reintroduced into the fractionation column 20 at a location at or below the upper level of pooled FCC slurry 30 within the fractionation column 20. Introducing the MCB quenching stream 60 directly into the pooled FCC slurry 30 facilitates mixing and thus cooling (i.e., quenching) of the pooled FCC slurry 30. In some embodiments, a second portion 70 of the cooled first FCC slurry stream 40 is reintroduced into the fractionation column 20 at a point above the entry of the FCC effluent 10. Reintroduction of the cooled second portion 70 at this location facilitates cooling and condensing vapors from the FCC effluent 10, as well as further quenching of the pooled FCC slurry 30. Modulation of the flow rate and temperature drop of the FCC slurry stream 40 through the cooling zone 50 allows a user to modulate, at least to some extent, the temperature of the pooled FCC slurry 30 in the fractionation column 20, thus reducing coking and fouling and encouraging condensation of vapors from the effluent in the fractionation column 20.

In embodiments of methods and apparatuses described herein, a second FCC slurry stream 140 is drawn from the fractionation column 20 at a second location 145. In some embodiments, the second location 145 is above the entry of the MCB quench stream 60 to the pooled FCC slurry 30. In some embodiments, and as shown in FIG. 1, the second FCC slurry stream 140 may be drawn via a drawoff well 150 located inside the fractionation column 20. The shape, size, and orientation of the drawoff well 150 may be such that the drawoff well 150 reduces or prevents mixing of the contents therein with the MCB quench stream 60. As such, a drawoff well 150 further facilitates removal of the second FCC slurry stream 140 at a second temperature that is higher than the temperature of the first FCC slurry stream 40. Further, the shape, size, and orientation of the drawoff well 150 may be selected so as to reduce residence time of unquenched FCC slurry in the well 150, and thus, reduce fouling of the drawoff well 150 and lines connecting the drawoff well 150 to a separation zone 90, discussed below. In some embodiments, the temperature of the second FCC slurry stream 140 when it leaves the fractionation column 20 is about 365° C. to about 390° C., such as about 370° C. to about 385° C.

A hydrocarbon stream is separated from the second FCC slurry stream 140. For example, in embodiments and as shown in FIG. 1, the second FCC slurry stream 140 is sent to a separation zone 90 for separation and recovery of one or more hydrocarbon streams. As will be appreciated, any suitable separation technique may be employed. In some embodiments, the separation zone 90 employs a vacuum fractionation column 100 to generate at least a first slurry product stream 110 and a separated MCB stream 120. In some embodiments, the second FCC slurry stream 140 is routed to the separation zone 90 without passing through a component or sub-system designed to increase (i.e., heat) or reduce (i.e., cool) the temperature of the second FCC slurry stream 140. That is, the second FCC slurry stream 140 may be directly introduced to the separation zone 90 at or near the temperature at which it is drawn from the fractionation column 20. Thus, in some embodiments, the second FCC slurry stream 140 is introduced into the separation zone 90 at a temperature of about 365° C. to about 390° C., such as about 370° C. to about 385° C. Providing the second FCC slurry stream 140 to the separation zone 90 at a temperature higher than the first FCC slurry stream 40 allows for increased separation efficiency relative to conventional apparatuses and methods where separation is conducted on a quenched FCC slurry stream (i.e., the first FCC slurry stream 40). Thus, in some embodiments, vacuum fractionation advantageously allows for separation and recovery of a hydrocarbon stream without subjecting the second FCC slurry stream 140 to temperatures at which coking is likely to be a significant problem.

Note that separation zone 90 is not limited to generation of only a single slurry product stream 110; rather a plurality of slurry product streams, each with potentially different compositions, may be generated as allowed by the particular separation equipment or technique employed. For example, FIG. 1 shows generation of a first slurry product stream 110 which may comprise light cycle oil, and a second slurry product stream 130 which may comprise heavy cycle oil. The separated MCB stream 120 may be sent to storage for clarification, i.e., removal of catalyst fines, and recovery of clarified slurry oil.

In some embodiments, such as the exemplary embodiment seen in FIG. 1, the cooling zone 50 is in fluid communication with the separation zone 90. In these embodiments, a valve 160 may be located between the cooling zone 50 and separation zone 90 so as to allow for continuous or intermittent flow of a third portion 80 of the first FCC slurry stream 40 to the separation zone 90. Such embodiments may optionally include directing the third portion 80 of the first FCC slurry stream 40 to the separation zone 90 only intermittently, with intermittent flow being used to purge the bottom of the fractionation column 20 of accumulated particulates. However, the ability to continuously route the third portion 80 of the first FCC slurry stream 40 to the separation zone 90 serves as a back-up option for removal of pooled FCC slurry 30 from the fractionation column 20 in case the drawoff well 150 or any other component associated with routing the second FCC slurry stream 140 to the separation zone 90 becomes fouled. In some embodiments, a valve 170 may be located between the fractionation column 20 and the separation zone 90 and positioned so as to prevent flow of the second FCC slurry stream 140 to the separation zone. This valve 170 may be used in an instance such as described above, where the drawoff well 150 or any other component associated with routing the second FCC slurry stream 140 to the separation zone 90 becomes fouled.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of recovering a hydrocarbon from fluid catalytic cracking slurry, the method comprising the steps of:
    contacting a feed with a catalyst in a fluid catalytic cracking ("FCC") reactor under conditions suitable to crack one or more hydrocarbons in the feed and generate a FCC effluent;

separating the FCC effluent with a fractionation column to generate a product stream and a FCC slurry, wherein the FCC slurry collects in a lower portion of the fractionation column forming a FCC slurry pool;

drawing a first FCC slurry stream at a first temperature from a first location in the FCC slurry pool;

returning at least a portion of the first FCC slurry stream to the fractionation column at a third location below an upper level of the FCC slurry pool;

drawing a second FCC slurry stream at a second temperature from a second location in the FCC slurry pool, wherein the second location is above the first location and the third location, and the second temperature is higher than the first temperature; and separating a hydrocarbon from the second FCC slurry stream.

2. The method of claim 1, wherein drawing the first FCC slurry stream at the first temperature comprises drawing the first FCC slurry stream at a first temperature of about 355° C. to about 365° C.

3. The method of claim 1, wherein drawing the second FCC slurry stream at the second temperature comprises drawing the second FCC slurry stream at a second temperature of about 365° C. to about 390° C.

4. The method of claim 1, wherein the first location is at or near the bottom of the fractionation column.

5. The method of claim 1, wherein drawing the second FCC slurry stream at the second temperature from the second location in the FCC slurry pool comprises drawing the second FCC slurry stream from the FCC slurry pool via a drawoff well located inside the fractionation column and configured to receive FCC slurry.

6. The method of claim 1, further comprising cooling the first FCC slurry stream before returning the at least the portion of the first FCC slurry stream to the fractionation column.

7. The method of claim 6, further comprising returning a second portion of the first FCC slurry stream to the fractionation column after cooling at a location in the fractionation column above the upper level of the FCC slurry pool.

8. The method of claim 1, wherein separating the hydrocarbon from the second FCC slurry stream comprises separating the hydrocarbon from the second FCC slurry stream with a vacuum fractionation column.

9. The method of claim 1, wherein separating the hydrocarbon from the second FCC slurry stream comprises separating a light cycle oil stream from the second FCC slurry stream.

10. The method of claim 1, wherein separating the hydrocarbon from the second FCC slurry stream comprises separating a heavy cycle oil stream from the second FCC slurry stream.

* * * * *